No. 771,672.

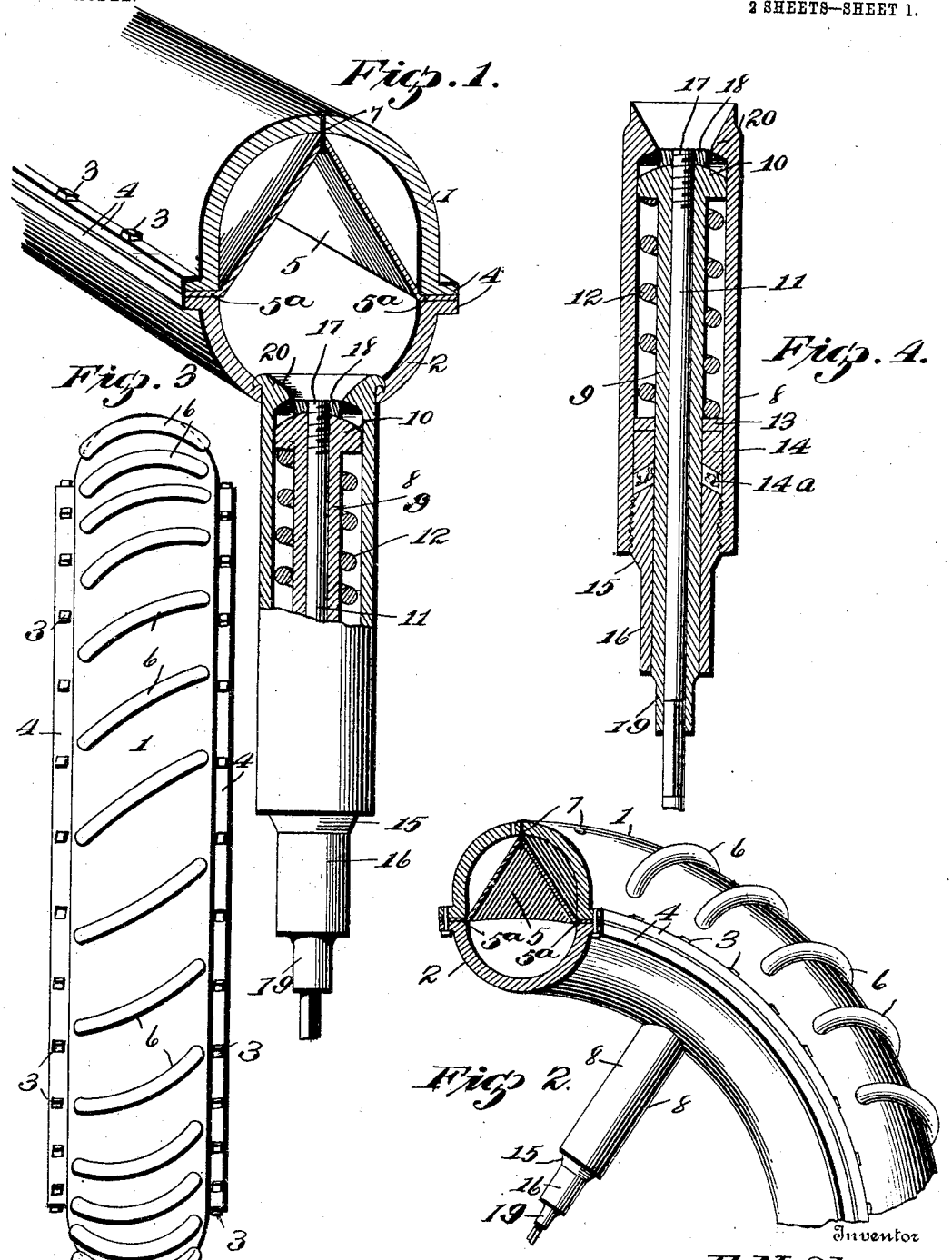

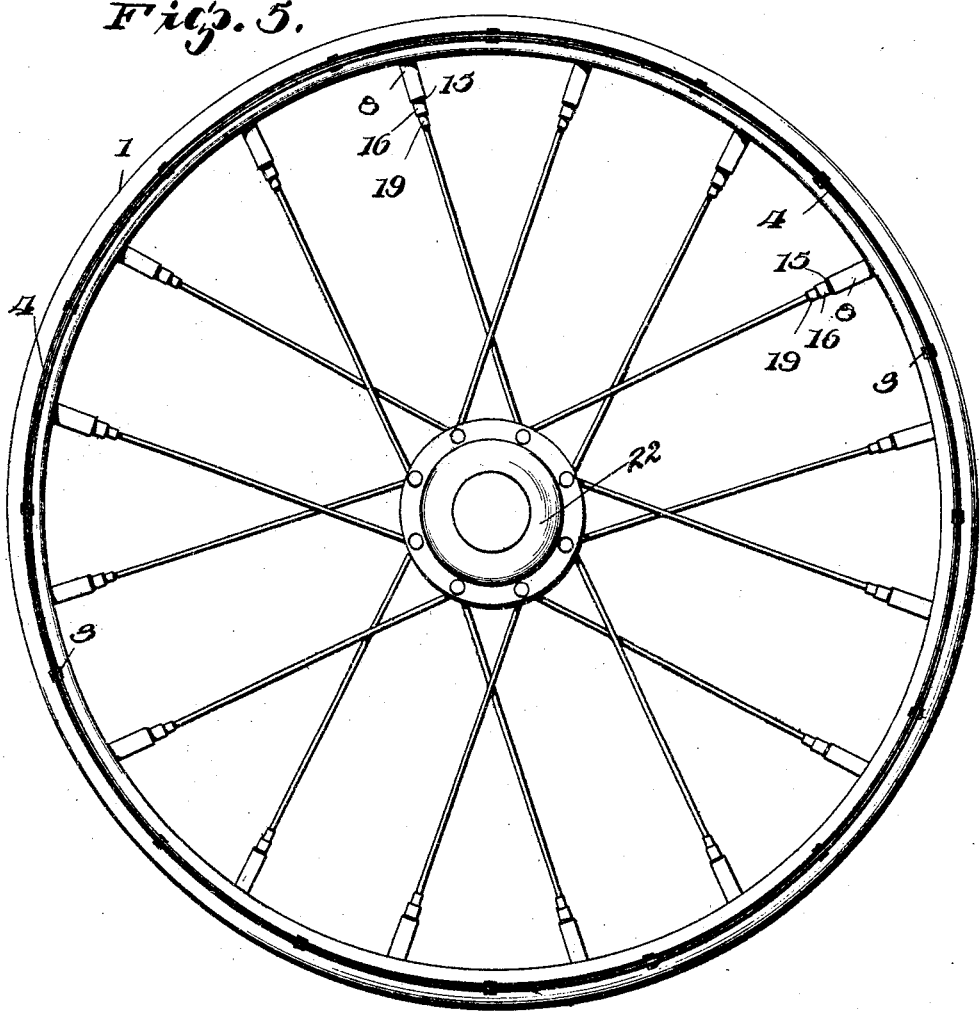

Patented October 4, 1904.

UNITED STATES PATENT OFFICE.

EDWARD N. SHELDON, OF MUNDEN, KANSAS.

SPRING-WHEEL.

SPECIFICATION forming part of Letters Patent No. 771,672, dated October 4, 1904.

Application filed April 15, 1904. Serial No. 203,360. (No model.)

*To all whom it may concern:*

Be it known that I, EDWARD N. SHELDON, a citizen of the United States, residing at Munden, in the county of Republic and State of Kansas, have invented certain new and useful Improvements in Spring-Wheels, of which the following is a specification.

This invention relates to improvements in that type of wheels in which vibration and jar of bodies supported by the wheels is absorbed by means of springs coöperating with the spokes of the wheels.

A special object of the invention is to provide peculiar mountings for the yielding sections between the spokes and the rim of the wheel.

A wheel constructed in accordance with my invention is particularly adapted for use for bicycles, automobiles, or similar vehicles.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a sectional view showing the rim construction of the wheel and the mounting of the spokes thereon. Fig. 2 is a perspective sectional view, parts broken away, showing a portion of the rim and casings projected therefrom. Fig. 3 is a plan view of the tread-section of the rim, bringing out more clearly the form of the diagonally-disposed ribs thereon. Fig. 4 is a vertical sectional view through one of the spoke-casings, showing the arrangement of parts therein. Fig. 5 is a side elevation of a wheel embodying the invention.

Corresponding and like parts are referred to in the following description and indicated in all the views of the drawings by the same reference characters.

Specifically describing my invention and referring to the drawings, the rim of the wheel is comprised of two sections, a tread-section 1 and a felly-section 2. The sections 1 and 2 are of somewhat semicircular form in cross-section and are preferably of light metal, forming a hollow rim. The sections 1 and 2 are secured together by means of suitable fastenings 3, which latter pass through flanges 4, formed at corresponding sides of the said sections. In order to brace and support the tread-section 1 to prevent the latter from being dented or otherwise injured in passing over obstacles or the like, a longitudinal V-shaped member 5 is secured between the sections 1 and 2 of the rim, being provided with flanges $5^a$, which latter are disposed and secured between the corresponding flanges 4 of the respective sections 1 and 2, being held in place by the fastenings 3, which have been before described. The upper or angular portion of the member 5 is disposed in contact with the inner side of the tread-section 1 and constitutes a rigid support therefor in a manner which will be readily appreciated. The tread-section 1 may be provided with diagonally-disposed tread-ribs 6, if desirable, for obvious purposes. The upper or angular portion of the brace member 5 is secured to the tread-section 1 by means of fastenings 7 in the form of rivets or the like, and thus the tread-section and the said member mutually brace each other in their relative positions.

Projected from the felly-section of the rim and inwardly extending therefrom are disposed a plurality of tubular casings 8, which latter are tangentially disposed relative to the hub, so that the spokes 11 will have a similar disposition. The number of the casings 8 corresponds with the number of spokes of the wheel, since the outer ends of the latter are designed to be mounted within the casings 8 in a manner which will now be described. A sleeve 9 is movably mounted in each casing 8, and this sleeve is provided at its outer end with a head 10, as shown clearly in Fig. 1. The sleeve 9 is tubular, so as to receive the outer end of the spoke 11, which coöperates therewith, and a spring 12 is disposed in the casing 8, bearing against the head 10 of the sleeve 9, so as to normally hold the head away from the outer end 20 of the casing 8. The casings 8 are secured to the rim in any suitable manner and are preferably held in position by having the outer ends thereof passed through openings in the tread-section 2 of the rim and swaged to secure them in place. The head 10 is engaged by the coil-spring 12 at one end of the latter, and the other end of this spring bears against a bushing 13, surrounding the sleeve 9 and located adjacent a stuffing-box which closes the inner end of the casings 8. The stuffing-box aforesaid, one of which is provided for each casing, consists of an inner gland 14, an interposed packing 14$^a$, and an outer gland 15. The outer gland 15 is provided with a reduced extension 16, and the latter is flattened upon opposite sides, so as to admit of application thereto of a wrench or like part, so as to screw the gland into the said casing. The inner end of the casing is internally threaded, so as to admit of the screwing action of the gland 15 in a manner above set forth.

The spoke 11 when secured in operative position has its outermost end, which is threaded, as shown at 17, screwed into the outer end of the sleeve 9, the outer end of the tubular portion of this sleeve being provided with threads for this purpose. The spoke is thus positively connected with the sleeve 9, and so as to effectually prevent displacement thereof a nut 18 is screwed upon the outer end of the spoke, which end projects slightly beyond the head 10 of the said sleeve 9. So as to facilitate the securance of the spoke 11 to the sleeve 9 the latter has its inner end reduced and squared, as shown at 19, to admit of use of a wrench upon this part also. The tension of the spring 12 is such as to normally hold the head 10 spaced from an annular shoulder 20 at the outer end of the casing 8. However, jar is absorbed by movement of the sleeve against the spring 12 as the wheel revolves.

The head 10 of the sleeve 9 is solid and virtually constitutes a closure for the outer end of the casing 8, and this is advantageous in that oil or any lubricant may be disposed within the body of the casing so as to properly lubricate the sleeve 9 in movement of the spoke received thereby. The lubricant within the casing prevents rattling of the parts and reduces the friction in a manner clearly apparent.

The general structure of the wheel is comparatively simple, and the same cushion or elastic effect attained by the use of the ordinary cushion on pneumatic tires is secured, the structure involved being cheaper and susceptible of a longer service.

The general structure of the wheel is shown in Fig. 5 of the drawings, and it will be noted that the spokes 11 are tangentially arranged relative to the hub 22, and these spokes are preferably flexible, similar to those which are now in common use on bicycle and automobile wheels. The inner ends of the spokes 11 are firmly secured to the hub 22, the outer ends being of course attached to the sleeve 9 within the casings 8. As the wheel revolves should the same strike an obstruction the jar will be absorbed by the springs 12. When the wheel meets the obstruction, the hub will of course move downwardly and the vertical or thrust spokes will receive a similar relative movement. The relatively horizontal spokes will have both a longitudinal and downward movement at the ends which are attached to the hub 22. The flexibility of the spokes is of course instrumental in securing the necessary resiliency and spring effect in the wheel structure

Having thus described the invention, what is claimed as new is—

1. In a spring-wheel, the combination of a rim, a tubular casing projected from the rim, a stuffing-box closing the inner end of the casing, a sleeve disposed in said casing and having one end projected out of said casing, a head projected from the outer end of the sleeve and closing the outer end of the casing, a spoke received by the sleeve and threaded at its outer end, a nut screwed upon the threaded end of the spoke to attach same to the sleeve, and a spring interposed between the head of the sleeve and the stuffing-box for the purpose set forth.

2. In a spring-wheel, the combination of a rim, a tubular casing projected from the rim, a stuffing-box closing the inner end of said casing, a sleeve movable in the casing and provided with a head at its outer end, said head closing the outer end of the casing, a spring disposed in the casing and interposed between the head of the sleeve and the stuffing-box aforesaid, and a spoke secured to the sleeve.

In testimony whereof I affix my signature in presence of two witnesses.

EDWARD N. SHELDON. [L. s.]

Witnesses:
JOHN KESL,
EDWARD RYBA.